Feb. 19, 1935.  E. H. REMDE  1,991,576
INDUSTRIAL TRUCK
Filed June 17, 1931  8 Sheets-Sheet 1

INVENTOR
Edward H. Remde
BY
Geo. B. Pitts
ATTORNEY

Feb. 19, 1935.　　　　　E. H. REMDE　　　　　1,991,576
INDUSTRIAL TRUCK
Filed June 17, 1931　　　8 Sheets-Sheet 2

INVENTOR
Edward H. Remde
BY Geo. B. Pitts
ATTORNEY

Feb. 19, 1935.  E. H. REMDE  1,991,576
INDUSTRIAL TRUCK
Filed June 17, 1931   8 Sheets-Sheet 7

INVENTOR
Edward H. Remde
BY Geo. A. Pitts
ATTORNEY

Patented Feb. 19, 1935

1,991,576

UNITED STATES PATENT OFFICE 1,991,576

INDUSTRIAL TRUCK

Edward H. Remde, Cleveland, Ohio, assignor to The Baker-Raulang Company, Cleveland, Ohio, a corporation of Ohio Application June 17, 1931, Serial No. 545,035

21 Claims. (Cl. 187—9)

This invention relates to an industrial truck.

One object of the invention is to provide an improved truck in which relatively heavy loads may be picked up, raised, transported and discharged in a ready manner and with minimum wear and strain on the elevating mechanism and the parts which support the weight of the load.

Another object of the invention is to provide an improved truck in which the weight of the load is carried over the traction wheels whereby maximum traction effort results in driving the truck over rough surfaces and on ramps and steering on extreme radii may be provided for at the rear end of the truck.

Another object of the invention is to construct a truck in which the load carrying member may be raised to elevations above the normal height of the truck and the guides therefor positively controlled at all positions of said member.

Another object of the invention is to construct a truck in which the load carrying member may be raised to elevations above the normal height of the truck and in which provision is made for tilting the guide frame whereby loads disposed at various elevations may be readily transported without danger of spilling the same.

A further object of the invention is to provide a tiering truck in which an endless chain or pair of chains, directly connected to the power mechanism, is utilized to raise and lower the load carrying member and in which means are provided for taking up slack in the chain or chains and particularly any undue slack resulting from the engagement of the load or the load carrying member with an obstruction.

Other objects of the invention will be apparent to those skilled in the art to which my invention relates from the following description taken in connection with the accompanying drawings, wherein.

In the drawings, 1 indicates a frame consisting of (a) two vertical side plates 1a rigidly connected in spaced relation by cross members (not shown) and parts (hereinafter referred to) supported on and connected to the plates, (b) longitudinal angle bars 1b on which the batteries 2 or other form of power supply rests and (c) upright members 3 adjacent the rear end of the plates 1a.

4 indicates the traction wheels disposed at the front end of the frame 1. 5 indicates the steering wheels at the rear of the frame 1, these wheels being mounted on knuckles and operated through connections 6, by a lever 7. The plates 1a are cut away to accommodate the swinging movement of the wheels.

Figures 6, 10, 11:
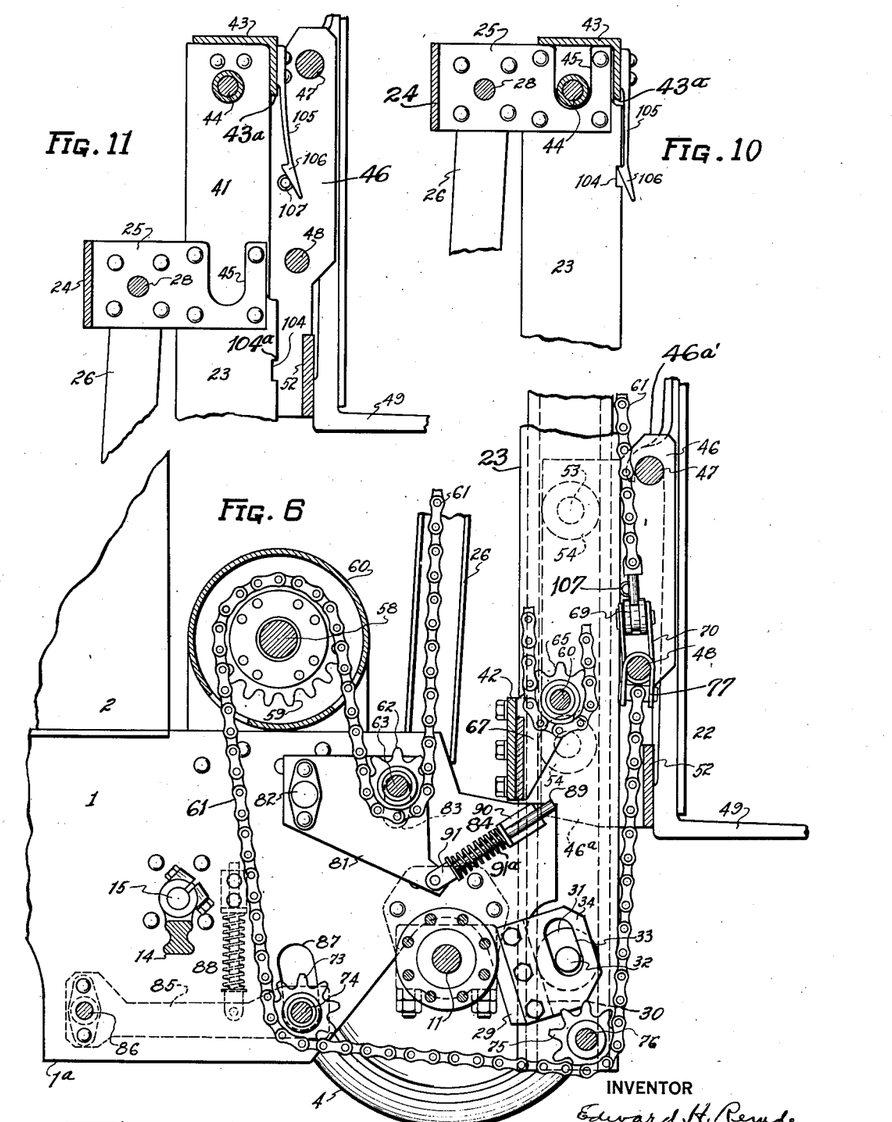
Fig. 6 is a fragmentary section, enlarged on the line 6—6 of Fig. 4.
Fig. 10 is a fragmentary section showing the automatic locking means between the lower and upper guide sections.
Fig. 11 is a fragmentary section showing the unlocking or release of the upper guide section and raising thereof by the elevating member.

The traction wheels 4 are driven by a motor 8 having a propeller shaft within a casing 9 transmitting power through a power mechanism of the differential type, in a casing 10, to drive the axles 11 for the wheels 4. The side walls of the casing 10 are provided with tubular members 12 through which the axles 11 extend. The plates 1a are formed with openings through which the tubular members extend, the inner sides of the plates being provided with pillow blocks 12a engaging the tubular members to support the plates 1a thereon. One pair of these blocks is shown in Fig. 6, the upper one thereof being provided with a flange which is suitably riveted to the adjacent plate 1a. The sides and bottom of the casing 10 are extended inwardly to form a cradle 13 to which the motor 8 is rigidly connected. 14 indicates a torque member, substantially of U-shape, its opposite ends being trunnioned at 15 in the frame plates 1a and its intermediate portion being connected by a universal joint to the free end of the cradle 13. The construction of the torque member 14, its mounting and connection to the cradle are similar to like parts disclosed in U. S. Letters Patent No 1,628,145, to which reference may be made.

15' indicates the operative's platform. 16 indicates a foot pedal for a brake 17. The brake comprises braking elements 17a adapted to engage a wheel 17b fixed to the shaft of the motor 8. The brake elements are connected through suitable connections 18 to the pedal 16, the elements 17a being normally biased into braking position by a spring not shown, so that by depressing the pedal 16, the brake 17 will be released, whereby the truck may be driven. The supply of current from the batteries 2 to the motor 8 is controlled by a controller within a casing 19, the controller being connected to and operated by a handle 20.

Figures 7, 8:
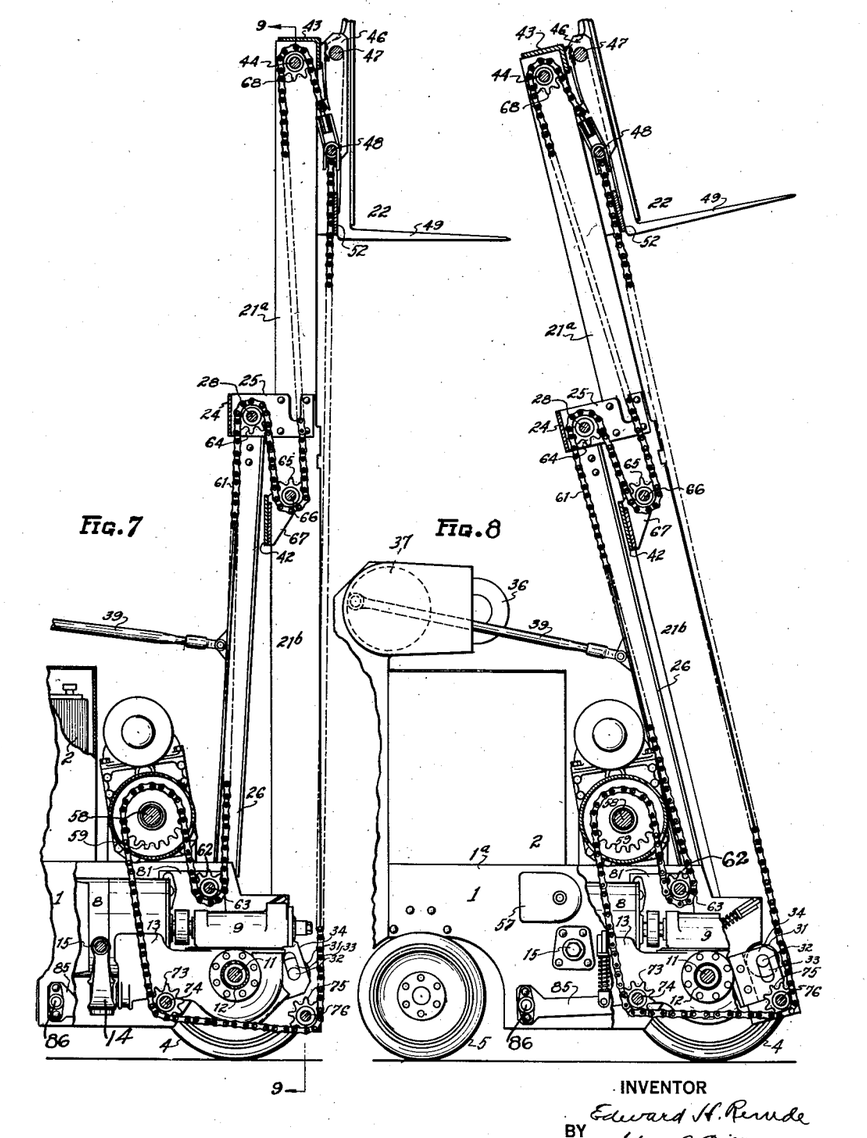
Fig. 7 is a fragmentary section on the line 7—7 of Figs. 4 and 9, showing the elevating member raised to its extreme upper position.
Fig. 8 is a view similar to Fig. 7, but showing the guide sections tilted inwardly.

21 indicates a substantially vertical guide at the front end of the frame for a raisable load carrying member indicated as an entirety at 22. In the form of construction shown in Figs. 1 to 11, inclusive, the guide 21 comprises a plurality of relatively movable sections, preferably two sections, 21a, 21b, the former one being movable or extensible relative to the section 21b and slidably carrying the load engaging member 22, whereby the latter may be raised to positions above the upper end of the section 21b, and the latter section being mounted on the frame 1, preferably in such manner that the guide 21, in any position of the elevating member 22 may be tilted inwardly, for example, as shown in Fig. 8. The guide section 21b consists of two spaced channel members 23, mounted as hereinafter set forth and rigidly connected at their upper ends by a cross member 24 connected to inwardly extending brackets 25. In the preferred form of construction, as shown in Figs. 1 to 11, inclusive, the guide section 21b is supported by and pivotally connected at its upper end to the upper ends of a pair of swingable members 26. The lower ends of the members 26 are provided with knuckles which are pivoted on the frame plates 1a, by stud shafts 27 on the outer sides thereof. The upper ends of the members 26 are provided with knuckles which are pivoted on the ends of a shaft 28 having bearing on and extending through the brackets 25. As the guide section 21a is slidably carried by the guide section 21b, movement of the latter will move the other section with it. The shafts 27 are so arranged that the guide 21 may be readily tilted inwardly (see Fig. 8) and outwardly (see Figs. 1 and 7) in a ready manner with the expenditure of a relatively small amount of power. The guide 21 at its lower end has sliding and pivotal engagement with the frame 1, this construction being provided for as follows: 29 indicates a plate suitably secured to the inner side of each side plate 1a and having an angle section forming a track or way 30 on which a roller 31 rolls. The roller 31 is loosely mounted on a stud shaft 32 mounted on the inner side of the guide section 21b. The shaft 32 is extended inwardly beyond the roller 31 through an elongated opening 33 formed in the off-set portion 34 of the plate 29 (see Figs. 6 and 7), whereby the engagement of the shaft with the side walls of the slot or opening 33 will prevent any outward swinging of the guide at its lower end, for example due to momentum in starting the truck with the elevating member and guide sections in the position shown in Figs. 7 and 8 or when the truck is being driven backwardly up an incline.

The mechanism for swinging or tilting the swingable members 26 comprises a power mechanism enclosed in a housing 35 and driven by an electric motor 36, which is supplied with current from the batteries 2. The power mechanism includes suitable gear reductions for driving a shaft or shaft sections to which are secured crank disks 37. The supply of current to the motor 36 is controlled by a controller 38 having an operating handle 38a. The crank disks 37 are connected to the members 26 by rods 39, the length of the latter being such that when the crank disks 37 are rotated a half revolution to the position shown in Fig. 1, the members 26 are moved outwardly and support the guide in substantially vertical position and when the disks are rotated a half revolution to the position shown in Fig. 8, the members 26 are swung inwardly and hence tilt the guide as shown in this view. As the pivots between the rods 39 and the disks 37 have the same angular relation about the shaft for the latter, and the disks are driven at the same speed and in the same direction, the rods act to swing the members 26 and through them the guide 21 outwardly to its normal vertical position or inwardly to its tilted position when the motor 36 is operated. It will be noted that the power mechanism within the housing 35, the crank disks 37 and rods 39 comprise a positive connection and moving means for the members 26 and accordingly by driving the motor 36 the members 26 may be swung through a long or short arc to tilt the guide to any desired inclination and then moved in either direction at will, irrespective of the position of the elevating member and the weight of the load thereon. As the motor shaft is held against rotation by a magnetic brake 40, when the current to the motor 36 is cut off, it will be seen that the power mechanism through the disks 37 will support the members 26 in any intermediate position to which they may be operated and in the extreme inward position (Fig. 8) they will be supported by the disks 37. The construction of the motor 36, magnetic brake 40, power mechanism and gear reductions within the housing 35 are similar to corresponding parts shown and described in my application Ser. No. 436,855 (see Letters Patent No. 1,904,984 dated April 18, 1933), except that the shaft sections driven by said mechanism have connected to them the disks 37, instead of cable winding drums or chain sprockets. The housing 35 for the power mechanism driven by the motor 36 is preferably mounted on the uprights 3. The rods 39 extend substantially horizontally from the disks 37 to the members 26, so that minimum power is required to swing the members 26 about their pivots 27.

The spaced channels 23 constituting the guide section 21b are disposed with their channels facing outwardly and slidably support channel members 41, which constitute the guide section 21a. The channel members 41 are of a size to freely slide in the channels 23, so that they may be moved downwardly to the position shown in Fig. 1 or extended as shown in Figs. 7 and 8. The channels of the members 41 face outwardly for a purpose later to appear.

Figure 1:
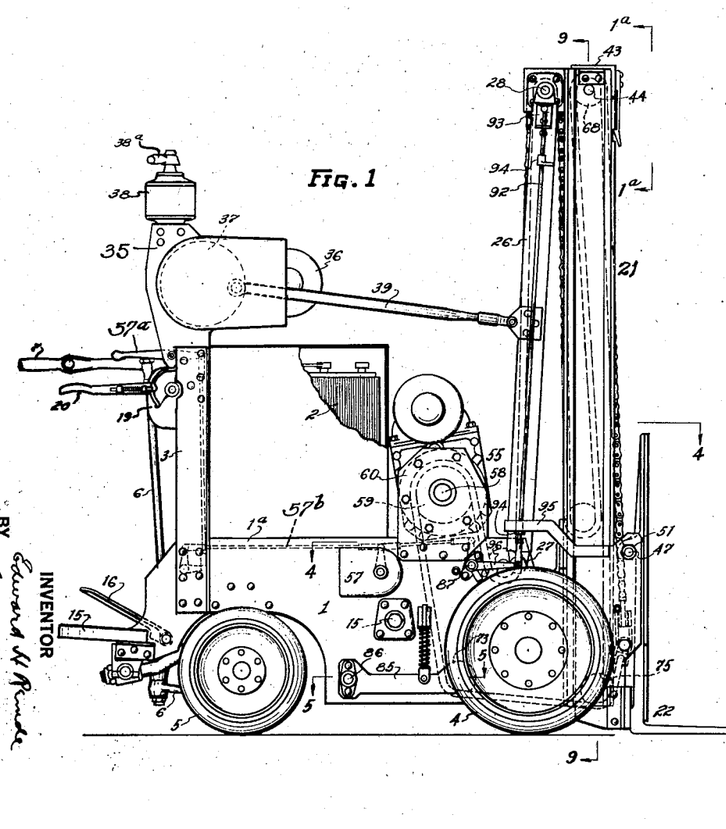
Fig. 1 is a side elevation of a truck embodying my invention, parts being broken away.
Figures 1A, 1B, 9:
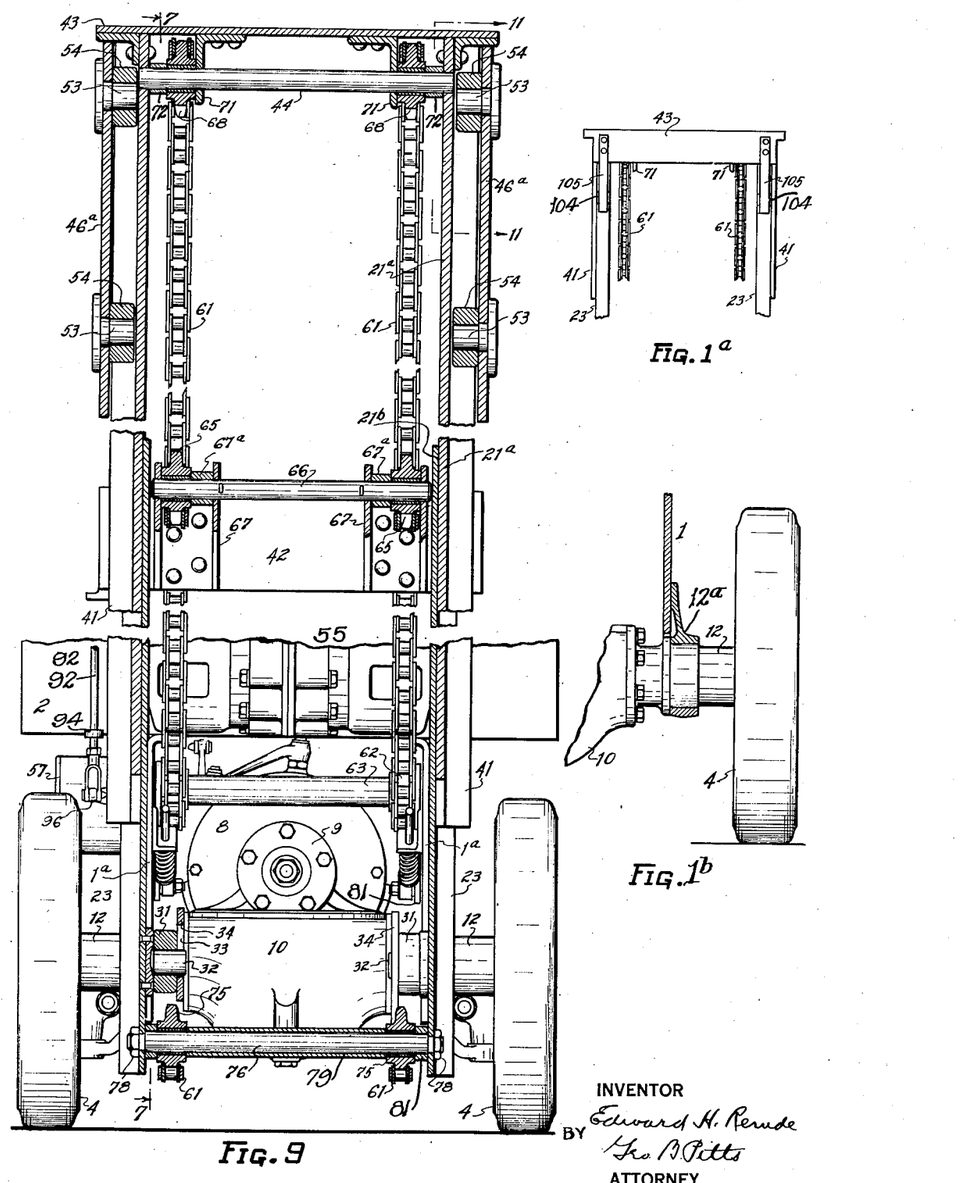
Fig. 1a is a fragmentary elevation on the line 1a—1a of Fig. 1.
Fig. 1b is a fragmentary view, partly in section showing the mounting of the traction wheel axle in the truck frame.
Fig. 9 is a section on the line 9—9 of Fig. 7.
Figure 2:
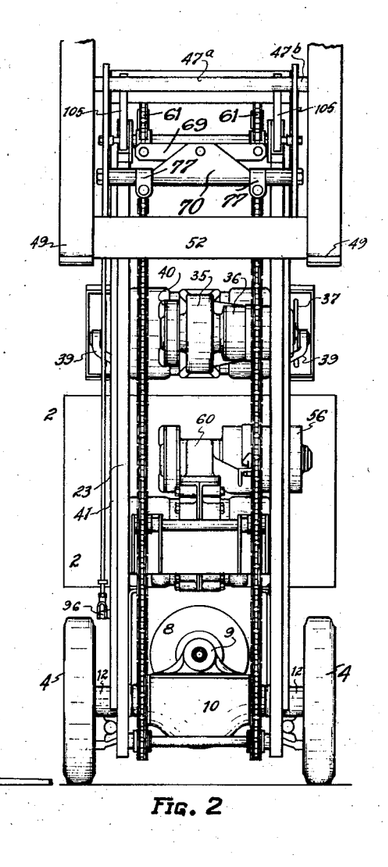
Fig. 2 is a front view, the elevating member being raised to an intermediate position.
Figures 3, 4, 5, 5A:
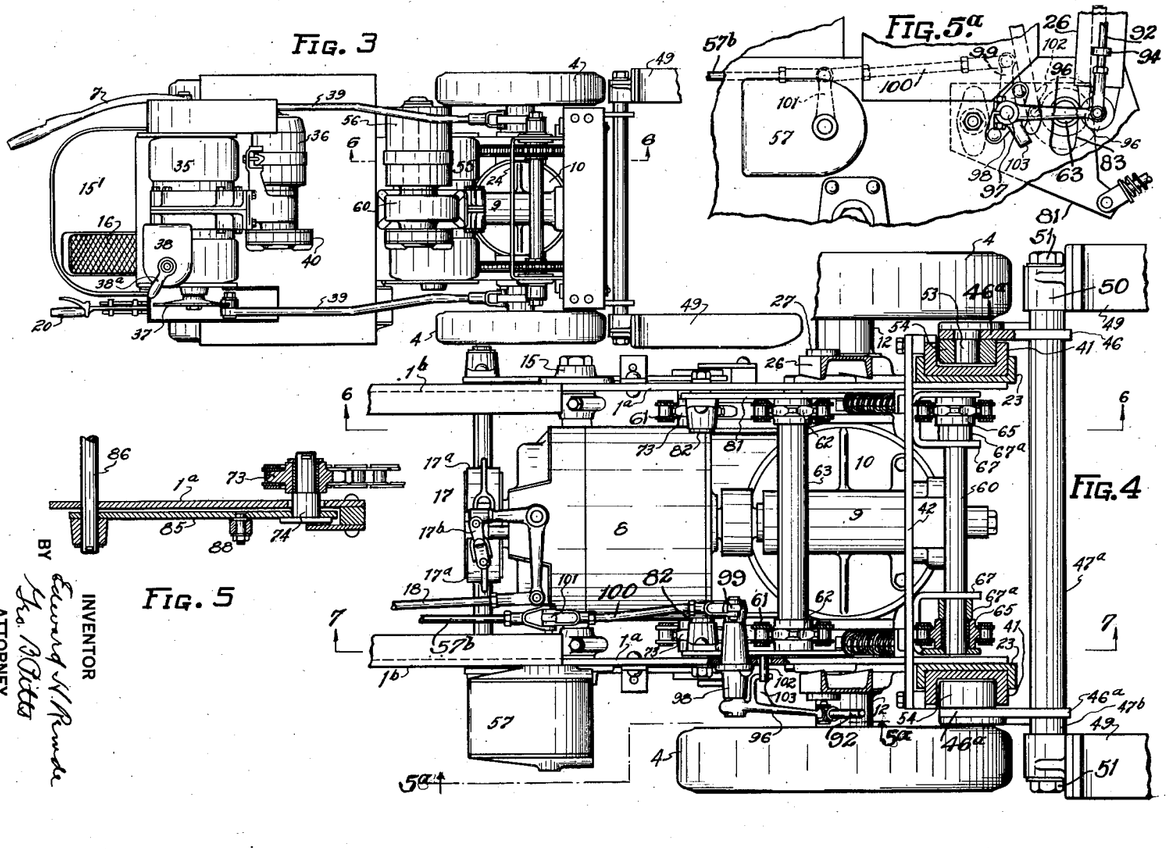
Fig. 3 is a plan view, parts being broken away.
Fig. 4 is a fragmentary section substantially on the line 4—4 of Fig. 1.
Fig. 5 is a fragmentary section on the line 5—5 of Fig. 1.
Fig. 5a is a fragmentary section on the line 5a—5a of Fig. 4.

When the guide sections are related as shown in Fig. 1, the truck may be driven through doorways and below relatively low overhead structures, without being disassembled; but by making the guide in sections and moving one endwise relative to the other, the load engaging member 22 may be raised to higher elevations, as shown in Figs. 7 and 8.

The channel members 41 are rigidly connected in spaced relation by a cross member 42 near their lower ends and by an angle 43 at their upper ends. When lowered, a transverse shaft 44, supported at its opposite ends in the channel members 41 slides into and rests on the bottoms of recesses 45 formed in the upper ends of the channel members 23 and also the overlapping portions of the brackets 25, to support the guide section in its down or lowermost position.

The load carrying member 22 comprises a pair of spaced plates 46, slidably supported on the guide 21 as hereinafter set forth, a pair of rods 47, 48, extending between the plates, and load engaging elements 49 removably connected to the rods. The plates 46 are held in rigid spaced relation in the following manner: (a) the rod 48 is provided with a sleeve 48a between the plates 46 and nuts 49 threaded on the ends of the rod 48 and tightened against the plates serve to clamp the latter against the ends of the sleeve 48a; and (b) the rod 47, which is extended beyond the plates 46, so as to carry the elements 49, is provided with a sleeve 47a between the plates 46 and a sleeve 47b between each plate and the hook 50 on the upright leg of the adjacent element 49 and these parts are clamped together by nuts 51 threaded on the ends of the rod 47 at the outer sides of the hooks 50. The upright legs of the elements 49 rest against a plate 52 suitably secured to the plates 46. By loosening the nuts 51, the elements 49 may be removed and load engaging elements of a different construction or shape substituted. As shown in Fig. 6, the plates 46 have inwardly extending portions 46a which overlap the outer sides of the channel members 41 and these portions have inwardly extending stud shafts 53 on which loosely rotate rollers 54, the rollers having engagement with the inner side walls of the channels 41 to slidably support the load carrying member on the guide section 21a.

55 indicates as an entirety the hoisting mechanism for the elevating member 22 and guide section 21a. Of this mechanism, 56 indicates a motor of the electric type connected to and supplied with current from the batteries 2, such supply being controlled by a controller 57. The controller 57 is operated by a handle 57a, which is connected to the operating shaft of the controller by suitable connections 57b. The shaft of the motor 56 transmits power through a power mechanism (including suitable gear reductions) to a shaft or shaft sections 58 to which are connected chain sprockets 59. The power mechanism and gear reductions are enclosed in a housing 60. The shaft of the motor 56 is braked by a magnetic brake, which is connected in series with the motor, so that when current is supplied to the motor the brake is released and when the current is cut off, the brake is automatically applied. The construction and operation of the motor and its brake mechanism and the power mechanism are preferably similar to corresponding parts already described in connection with the swinging of the members 26, except that the shafts 58 have connected to them the chain sprockets instead of crank disks.

61 is a pair of sprocket chains which run over the sprockets 59 and are connected to the elevating or load carrying member 22 and interconnected to the guide section 21a whereby these parts are raised and lowered. In my disclosed forms of construction the free end portions of the chains, that is, those portions through which the power of the motor is not transmitted, are supported and controlled to permit the free and unobstructed operation of the driven sprockets to transmit pull through, or pay out of, those portions of the chains between the sprockets and the load carrying member in the raising and lowering of the latter. In Figs. 1 to 11, inclusive, the outer or free ends of the power and non-power transmitting portions of the chains are connected to the load carrying member 22 and constitute in effect endless chains. In this form of construction, the chains 61 lead from one side of the sprockets 59 around sprockets 62 loosely mounted on a shaft 63, which is movably supported as hereinafter set forth, then to and around sprockets 64 loosely mounted on the shaft 28 supported at its opposite ends at the upper ends of the swingable members 26; from the sprockets 64 the chains extend to and around sprockets 65, each loosely mounted on a shaft 66 supported at its ends in U-brackets 67 fixed to the cross member 42; from the sprockets 65 the chains extend to and around sprockets 68 loosely mounted on the shaft 44, the free ends of the chains being suitably connected to the opposite ends of an equalizing bar 69 trunnioned between the ends of a U-shaped connecting member 70 engaging the rod 48. Each sprocket 65 is mounted between the arms of the adjacent bracket 67 and held against one arm by a sleeve 67a. Each sprocket 68 is positioned on the shaft 44 between the side of an angle 71 depending from the plate 43 and a sleeve 72 engaging the inner face of the adjacent channel member 41.

From the other side of the sprockets 59 the chains extend to and around sprockets 73, loosely mounted on shafts 74, which are movably supported in the manner hereinafter set forth; from the sprockets 73 the chains 61 extend to and around sprockets 75 loosely mounted on a shaft 76, and then upwardly, their free ends being connected to U-clips 77 engaging the rod 48. The shaft 76 is provided with shoulders against which the channel members 23 are clamped by nuts 78. Between the channel members 23, the shaft 76 is provided with sleeves 79, 80, which hold the sprockets in alignment with the sprockets 73.

The shaft 63 and the shafts 74 are mounted for conjoint operation to take up slack occurring in the chains and to automatically stop the motor 56 in the event undue slack in the cable occurs, for example, in the event the load carrying member 22 or guide section 21a engages an obstruction in their downward movement. For this purpose the shaft 63 is mounted near its opposite ends in a pair of plates 81 each pivotally mounted on a stud shaft 82 carried on the inner side of the adjacent plate 1a. The ends of the shaft 63 extend through the plates 81 and into and through elongated openings 83 formed in the side plates 1a, the upper ends of the openings serving as stops to limit the upward movement of the plates 81. Each plate 81 is normally acted upon by a spring mechanism 84 in opposition to the pull of the chains 61, so that upon slack occurring therein, the spring mechanism will act through the plates to move the shaft 63 downwardly and thus take up such slack. Each shaft 74 is mounted on a lever 85, which is disposed on the outer side of the adjacent plate 1a and pivoted on a stud shaft 86 carried thereby, the sprocket shaft extending through an elongated opening 87 formed in the plate 1a and the lower end of the opening serving as a stop to limit the downward movement of the shaft. Each lever 85 is normally acted upon by a spring mechanism 88 in opposition to the pull of the adjacent chain and yields when the load carrying member meets with an obstruction and pull on the chain results due to continued operation of the motor 56. The spring mechanism for each plate 81 and for each lever 85 is similar in construction, so that the following description of one will suffice for all thereof. Referring particularly to Fig. 6, and to the spring mechanism 84 shown therein, 89 indicates a rod pivoted at one end to the adjacent plate 81. The opposite end of the rod 89 extends through an opening formed in a bracket 90 fixed to the side plate 1a. The opening in the bracket 90 is large enough to permit the rod to swivel as well as slide therein. Adjacent its pivoted end, the rod 89 is provided with a collar 91 between which and the bracket 90 is mounted on expansion spring 91a of the coiled type, the spring being coiled around the rod.

One of the plates 81 is operatively connected with the controller 57 and operates the latter to move it to neutral position when slack occurs as above set forth.

92 indicates a rod disposed on the outer side and extending longitudinally of one of the swingable members 26, and slidably supported at its upper end by the walls of an opening formed in a bracket 93 which is fixed to the side of the adjacent member 26. Near its upper and lower ends the rod 92 is provided with adjustable tappets 94, arranged to be engaged by an arm 95 secured to and extending inwardly from the adjacent guide channel 41 of the guide section 21a. The lower end of the rod 92 is pivotally connected to the outer end of an arm 96, fixed to a rock shaft 97. The rock shaft 97 is rotatably mounted in a bearing 98 suitably secured to the adjacent side plate 1a. The inner end of the rock shaft 97 carries an arm 99 which is connected by a link 100 to the operating arm 101 for the controller 57. When the controller 57 is operated in the direction to raise the load carrying member 22, the connections above referred to will move the rod 92 endwise downwardly. If this raising operation is continued until the guide section 21a is raised to the limit of its movement, the arm 95 will engage the upper tappet 94 and move the rod 92 upwardly, the effect of which will be to operate the controller arm 101 back to neutral position. The movement of the controller arm 101 back to neutral position when the load carrying member moves to its lowermost position is effected through the engagement of the arm 95 with the lower tappet 94, which engagement will move the rod 92 downwardly. When the slack take-up mechanism already referred to is operated, due to the engagement of the member 22 with an obstruction, the controller is moved to neutral position by the following parts: 102 indicates a pin provided on the plate 81 on that side of the truck frame adjacent the controller 57. The pin 102 projects laterally through an opening formed in the side plate 1a into operative relation to a lug 103, projecting from the arm 96. When the adjacent plate 81 is operated under the influence of its spring mechanism 84, the pin 102 swings the arm 96 and the latter through the shaft 97, arm 99, link 100 and arm 101, moves the controller 57 to neutral position, and thus stops the motor 56.

From the foregoing description it will be noted that since the non-power transmitting portions of the chains are connected to the elevating member 22, I am enabled to use a chain and sprocket or a pair of chains and sprockets directly connected to the elevating mechanism and to thus simplify the construction and arrangement of the hoist mechanism; at the same time the increase and decrease in effective lengths of the power transmitting and non-power transmitting portions of the chains are compensated for by providing spring actuated mountings for certain of the guiding and supporting chain sprockets.

In the foregoing construction the chains 61 are operatively connected to the movable guide section 21a intermediate their engagement with the guide sprockets 64 and load carrying member 22. Under normal operating conditions, in the driving of the chains 61 to raise the load carrying member to any desired elevation, such operation would first raise the load carrying member until the plates 46 thereof engage the angle 43 and thereafter such operation, if continued, would raise the guide section 21a. To prevent premature raising of the guide section 21a, due to friction between the load carrying member 22 and guide section or the weight of the load engaged by the member, I provide means for locking the guide section 21a to the section 21b, which means are automatically controlled by the load carrying member 22, that is, released when the member 22 reaches the limit of its up movement relative to the guide section 21a and reengaged or locked when the member 22 moves to a point below the upper end of the section 21a. Of the locking and releasing means, 104 indicates a recess formed in the outer end wall of each channel member 23 to provide a locking shoulder 104a. 105, 105, indicates two spring operated dogs, preferably in the form of resilient elements secured to the vertical wall of the angle 43 and depending therefrom, and having on their lower ends catches 106 normally pressed toward the channel members 41 and arranged to engage the shoulders 104a as shown in Fig. 10. The free ends of the elements 105 are curved or bent outwardly so as to be disposed in the path of movement of a releasing device 107, preferably comprising a rod extending between and supported by the plates 46, which rod engages the outwardly curved ends of the elements 105 and bends or flexes the latter outwardly, as shown in Fig. 11, and releases them from the shoulder 104a. As shown, the rod 46 is disposed a greater distance from the upper end portion 46a' (see Fig. 6) of the plates 46 than the distance from the lower edge (43a) of the angle 43 to the catches 106, so that the rod will automatically release the catches before the load carrying member 22 engages the guide section 21a to lift it.

Figures 12, 13:
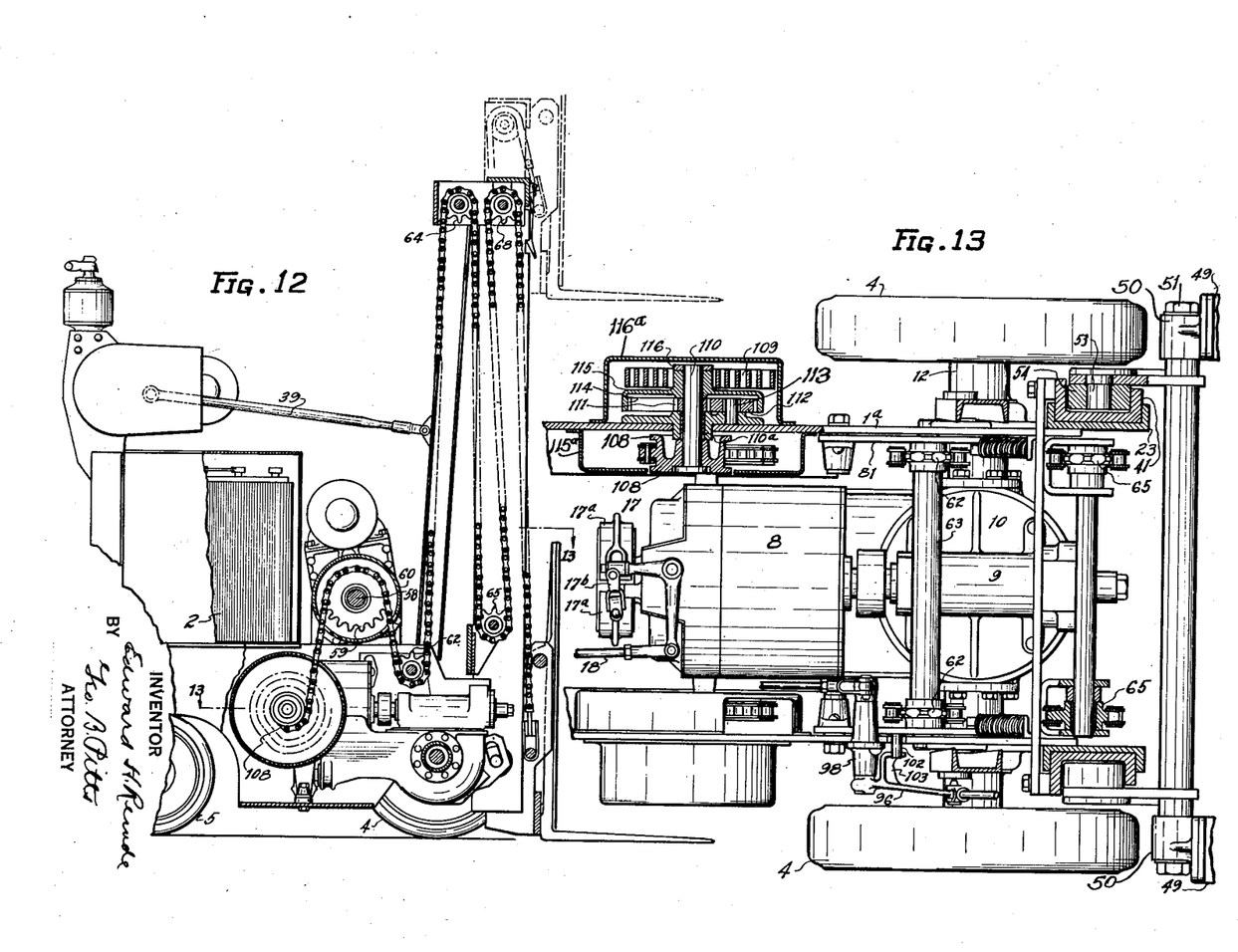
Fig. 12 is a fragmentary section substantially similar to Fig. 7, but showing a modified arrangement for the hoisting chains.
Fig. 13 is a section substantially on the line 13—13 of Fig. 12.
Figure 14:
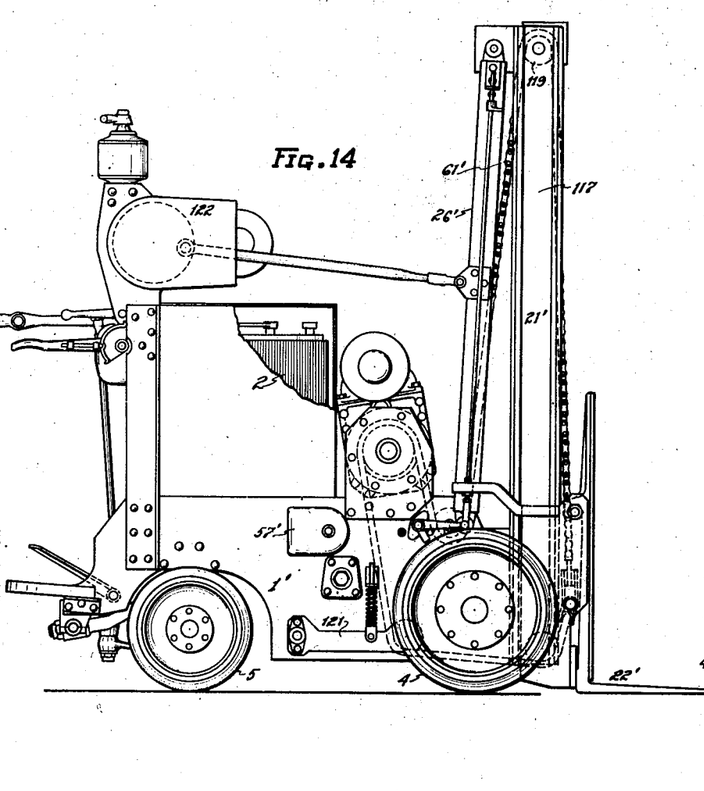
Fig. 14 is a side elevation of a truck (parts being broken away) embodying my invention but in which the construction is modified.
Figure 15:
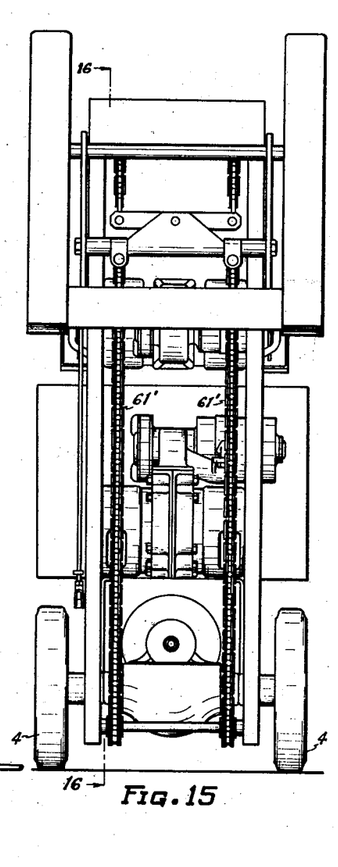
Fig. 15 is a front view of the truck shown in Fig. 14.
Figure 16:
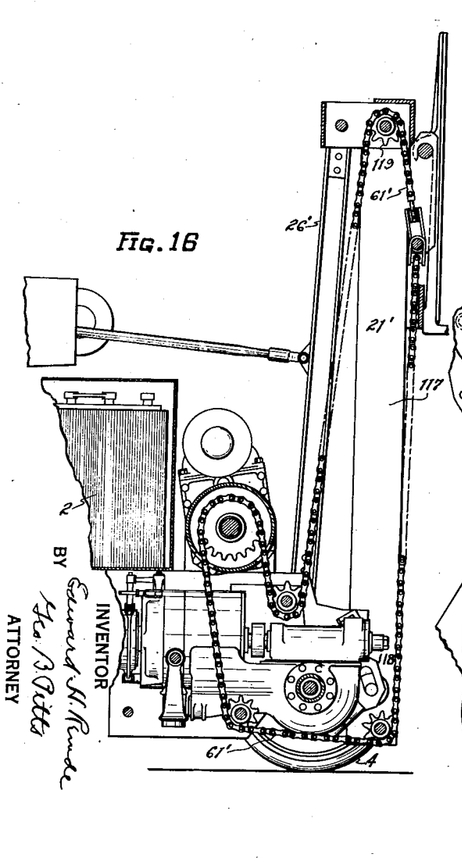
Fig. 16 is a fragmentary section substantially on the line 16—16 of Fig. 15, but showing the elevating member raised to substantially its extreme upper position.
Figure 17:
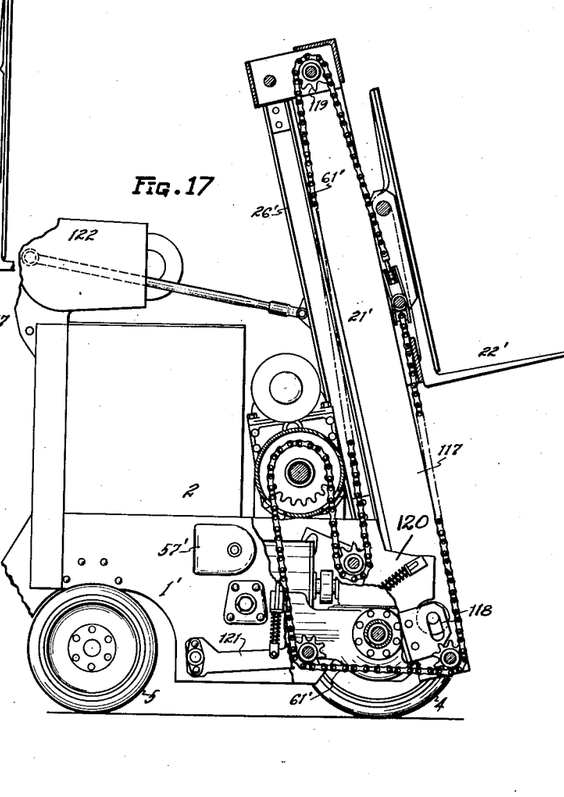
Fig. 17 is a fragmentary view substantially similar to Fig. 16, but showing the guide means tilted inwardly.

In Figs 12 and 13 I have shown a form of construction in which the non-power transmitting portions of the chains 61 are guided and supported in a different manner. In this form of construction I provide for each chain 61 a spring actuated drum 108 on which the chain winds under the influence of a spring 109 when the motor 56 is driven to raise the load carrying member 22 and permits the feeding of the chain while maintaining it taut in the lowering movement of the load carrying member. The drum 108 for each chain 61 is fixed to a shaft 110 mounted in a suitable bearing 110a carried by the adjacent side plate 1a. The shaft 110 extends to either side of the side plate 1a, the drum being mounted on the inner side thereof and the spring being mounted on its other side. The shaft 110 has fixed to it a pinion 111 which meshes with a gear 112 mounted on a stationary shaft 113 suitably supported in the flange of the bearing 110a. The gear 112 in turn meshes with an internal gear 114 provided on the flange of a disk 115, the hub of which loosely rotates on the outer end of the shaft and held thereon by a device 116. The spring 109 is secured at its inner end to the hub of the disk. The outer end of the spring is anchored in any suitable manner. The parts above described may be enclosed in casings 115a, 116a, removably secured to the adjacent side plate 1a.

In Figs. 14, 15, 16 and 17 I have shown a form of construction utilizing a pair of chains 61' for raising and lowering the load carrying member 22', and the latter is mounted on a guide 21' comprising a pair of similar members 117 pivotally connected to and supported upon a pair of swingable members 26'. The swingable members are mounted similarly to the members 26 already described and the guide 21' comprises a single section which is supported at its upper ends and tilted inwardly and outwardly by the members 26' and also pivotally and slidably connected to the frame 1' as shown at 118, the pivotal and slidable connection 118 being similar to corresponding parts already described. The chains 61' are supported, driven and connected to the load carrying member 22' similar to the loading, driving and connections for the chains 61, except that by reason of the omission of the sectional movable guide section, the chains, after running over the sprockets 119 at the upper end of the guide 21' they extend downwardly and are connected directly to the load carrying member. In this form of construction the slack take up mechanism, indicated as an entirety at 120, is similar in construction to the slack take up mechanism already described and is operatively connected to the controller 57' in the same manner as already set forth. Likewise the take up or yieldable mechanism indicated as an entirety at 121 is similar in construction to corresponding parts already described, so that the chains are substantially endless and guided throughout the entire operation of raising or lowering a load, or in the event the load carrying member engages an obstruction in its downward movement. The tilting mechanism is indicated as an entirety at 122 and is constructed and operated similar to the tilting mechanism already described herein. From the foregoing description it will be seen that the hoisting mechanism utilizing chains may be employed in connection with a load carrying member which is mounted upon a single guide, also a guide that is tiltable, as well as on a guide comprising relatively movable sections. It will also be obvious that the form of construction shown in Figs. 12 and 13 may be utilized as a take up mechanism for the non-power transmitting portions of the chains in a construction wherein the load carrying member is mounted upon a relatively stationary guide.

It will also be noted that in the embodiments of my invention the power transmitting portions and the non-power transmitting portions of the chains are guided and controlled throughout the entire travel of the load carrying member in either direction and also that slack in the chains may be quickly taken up, and the power shut off to avoid displacement, twisting or breakage of the chains and the sprockets over which they run.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limited.

What I claim is:

1. In an industrial truck, the combination of a wheel mounted frame, a substantially vertical guide on said frame, a load carrying member slidably mounted on said guide, a power mechanism on said frame having a sprocket driven thereby, a sprocket chain having its intermediate portion engaging said sprocket, a sprocket at the upper end of said guide over which the power transmitting portion of the chain runs, the outer end of said power transmitting portion being connected to said load carrying member, a slack take up mechanism operatively connected to said power transmitting portion of said chain and arranged to take up slack therein, and means for guiding and supporting the non-power transmitting portion of the chain, said means comprising a spring operated drum normally tending to wind said chain portion thereon.

2. In an industrial truck, the combination of a wheel mounted frame, a substantially vertical guide comprising a main section mounted on said frame and a separate section slidably mounted on said main section, a load carrying member slidably mounted on said separate guide section, a power mechanism on said frame having a sprocket driven thereby, a sprocket chain having its intermediate portion engaging said sprocket, sprockets at the upper ends of said guide sections and at the lower end of said separate section around which the power transmitting portion of the chain runs, the outer end of said power transmitting portion being connected to said load carrying member, a slack take up mechanism operatively connected to said power transmitting portion of said chain and arranged to take up slack therein, and spring actuated means for guiding and supporting the non-power transmitting portion of the chain.

3. In an industrial truck, the combination of a wheel mounted frame, a substantially vertical guide comprising a main section mounted on said frame and a separate section slidably mounted on said main section, a load carrying member slidably mounted on said separate guide section, a power mechanism on said frame having a sprocket driven thereby, a sprocket chain having its intermediate portion engaging said sprocket, sprockets at the upper ends of said guide sections and at the lower end of said separate section around which the power transmitting portion of the chain runs, a sprocket at the lower end of said main guide section around which the non-power transmitting portion of the chain runs, the outer ends of said chain being connected to said load carrying member, a slack take up mechanism operatively connected to said power transmitting portion of said chain and arranged to take up slack therein, and spring actuated means for guiding and supporting the non-power transmitting portion of the chain between said driven sprocket and the sprocket at the lower end of said main guide section.

4. In an industrial truck, the combination of a wheel mounted frame, a substantially vertical guide comprising a main section mounted on said frame and a separate section slidably mounted on said main section, a load carrying member slidably mounted on said separate guide section, a power mechanism on said frame having a sprocket driven thereby, a sprocket chain having its intermediate portion engaging said sprocket, sprockets at the upper ends of said guide sections and at the lower end of said separate section around which the power transmitting portion of the chain runs, a sprocket at the lower end of said main guide section around which the non-power transmitting portion of the chain runs, the outer ends of said chain being connected to said load carrying member, a slack take up mechanism operatively connected to said power transmitting portion of said chain and arranged to take up slack therein, and means for guiding and supporting the non-power transmitting portion of the chain between said driven sprocket and the sprocket at the lower end of said main guide section, said means including a spring operated device arranged to compensate for increase and decrease in length of said chain portion.

5. In an industrial truck, the combination of a wheel mounted frame, a substantially vertical guide comprising a main section mounted on said frame and a separate section slidably mounted on said main section, a load carrying member slidably mounted on said separate section, means connected to said member and interconnected to said separate section for raising and lowering them, and means for locking said guide sections together during travel of said member along said separate section.

6. In an industrial truck, the combination of a wheel mounted frame, a substantially vertical guide comprising a main section mounted on said frame and a separate section slidably mounted on said main section, a load carrying member slidably mounted on said separate section, means connected to said member and interconnected to said separate section for raising and lowering them, and means for locking said guide sections together during travel of said member along said separate section, the operation of said locking means being controlled by the raising and lowering of said member.

7. In an industrial truck, the combination of a wheel mounted frame, a substantially vertical guide comprising a main section mounted on said frame and a separate section slidably mounted on said main section, a load carrying member slidably mounted on said separate section, means connected to said member and interconnected to said separate section for raising and lowering them, and means for locking said guide sections together during travel of said member along said separate section, said locking means comprising a shoulder on said main guide section and a spring operated device arranged to engage said shoulder.

8. In an industrial truck, the combination of a wheel mounted frame, a substantially vertical guide comprising a main section mounted on said frame and a separate section slidably mounted on said main section, a load carrying member slidably mounted on said separate section, means connected to said member and interconnected to said separate section for raising and lowering them, means for locking said guide sections together during travel of said member along said separate section, said locking means comprising a shoulder on said main guide section and a spring operated device arranged to engage said shoulder, and a device on said load carrying member arranged in the upward movement thereof to engage said spring operated device and release it from said shoulder.

9. In an industrial truck, the combination of a wheel mounted frame, a guide comprising a main section and a separate section slidably mounted on said main section, a load carrying member slidably mounted on said separate section, means for pivotally supporting said main section on said frame, means for swinging said main guide section inwardly and outwardly, and means for raising and lowering said load carrying member and said separate section, said raising and lowering means comprising a power unit on said frame, sprockets on the upper and lower ends of said guide sections and an endless chain driven by said unit and guided by said sprockets and connected to said load carrying member, one portion of said chain engaging the sprocket at the upper end of said main guide section, the sprocket at the lower end of said separate section and the sprocket at the upper end of the latter section and leading from said latter sprocket to said member.

10. In an industrial truck, the combination of a wheel mounted frame, guide means comprising a main member, a supporting member pivotally mounted at its lower end on said frame inwardly of said main member and pivotally connected at its upper end to said member and a guide section slidably mounted on said main member, a load carrying device slidably mounted on said guide section, a pivotal slidable connection between said frame and the lower end of said main member, means for swinging one of said members inwardly and outwardly, and means for raising and lowering said load carrying device and said guide section, said swinging means comprising a power mechanism having a driven crank and rod between said crank and said member.

11. In an industrial truck, the combination of a wheel mounted frame, a guide comprising a main section and a separate section slidably mounted on said main section, a load carrying member slidably mounted on said separate section, means for movably supporting said main section on said frame, said means comprising a member pivotally mounted at its lower end on said frame inwardly of said main guide section and pivotally connected at its upper end to said section and a pivotal slidable connection between said frame and the lower end of said main guide section, means for swinging said last mentioned member inwardly and outwardly, and means for raising and lowering said load carrying member and said separate section, said raising and lowering means comprising a power mechanism having a driven sprocket, a sprocket mounted on an axis substantially coincident with the axis on which said last mentioned member swings, sprockets at the upper ends of said guide sections and a chain running over said sprockets and connected to said load carrying member.

12. In an industrial truck, the combination of a wheel mounted frame, a guide comprising a main section and a separate section slidably mounted on said main section, a load carrying member slidably mounted on said separate section, means for movably supporting said main section on said frame, said means comprising a member pivotally mounted at its lower end on said frame inwardly of said main guide section and pivotally connected at its upper end to said section and a pivotal slidable connection between said frame and the lower end of said main guide section, means for swinging said last mentioned member inwardly and outwardly, means for raising and lowering said load carrying member and said separate section, said raising and lowering means comprising a power mechanism having a driven sprocket, a sprocket movably mounted on an axis substantially coincident with the axis on which said last mentioned member swings, sprockets at the upper ends of said guide sections and a chain running over said sprockets and connected to said load carrying member, and a spring mechanism normally acting on said movable sprocket and arranged to take up slack occurring in said chain.

13. In an industrial truck, the combination of a wheel mounted frame, a guide comprising a main section and a separate section slidably mounted on said main section, a load carrying member slidably mounted on said separate section, means for movably supporting said main section on said frame, said means comprising a member pivotally mounted at its lower end on said frame inwardly of said main guide section and pivotally connected at its upper end to said section and a pivotal slidable connection between said frame and the lower end of said main guide section, means for swinging said last mentioned member inwardly and outwardly, means for raising and lowering said load carrying member and said separate section, said raising and lowering means comprising a power mechanism having a driven sprocket, a sprocket movably mounted on an axis substantially coincident with the axis on which said last mentioned member swings, sprockets at the upper ends of said guide sections, a sprocket at the lower end of said main guide section, a sprocket movably mounted inwardly of said last mentioned sprocket and a chain running over said sprockets and connected at its outer ends to said load carrying member, and spring mechanisms for moving said movable sprockets to compensate for increase and decrease in length of the chain portions between said driven sprocket and said load carrying member.

14. In an industrial truck, the combination of a wheel mounted frame, a guide comprising a main section and a separate section slidably mounted on said main section, a load carrying member slidably mounted on said separate section, means for movably supporting said main section on said frame, said means comprising a member pivotally mounted at its lower end on said frame inwardly of said main guide section and pivotally connected at its upper end to said section and a pivotal slidable connection between said frame and the lower end of said main guide section, means for swinging said last mentioned member inwardly and outwardly, means for raising and lowering said load carrying member and said separate section, said raising and lowering means comprising a power mechanism having a driven sprocket, a sprocket movably mounted on an axis substantially coincident with the axis on which said last mentioned member swings, sprockets at the upper ends of said guide sections, a sprocket at the lower end of said main guide section, a sprocket movably mounted inwardly of said last mentioned sprocket and a chain running over said sprockets and connected at its outer ends to said load carrying member, spring mechanisms for moving said movable sprockets to compensate for increase and decrease in length of the chain portions between said driven sprocket and said load carrying member, a switch means for controlling said power mechanism, and connections between one of said spring mechanisms and said switch means for moving the latter into inoperative position when said spring mechanism operates.

15. In an industrial truck, the combination of a wheel mounted frame, a main guide thereon, a separate guide slidable on said main guide, a load carrying member movable on said separate guide, power means on said frame, a guide element on the lower end of said main guide, a guide element on the upper end of said main guide, guide elements on the upper and lower ends of said separate guide, and an endless flexible member driven by said power means, one portion of said flexible member engaging the guide element at the lower end of said main guide and connected to said load carrying member and the other portion of said flexible member engaging the remaining guide elements and connected to said load carrying member.

16. In an industrial truck, the combination of a wheel mounted frame, a main guide thereon, a separate guide slidable on said main guide, a load carrying member movable on said separate guide, power means on said frame, a guide element on the lower end of said main guide, a guide element on the upper end of said main guide, guide elements on the upper and lower ends of said separate guide, an endless flexible member driven by said power means, one portion of said flexible member engaging the guide element at the lower end of said main guide and connected to said load carrying member and the other portion of said flexible member engaging the said remaining guide elements and connected to said load carrying member, and spring actuated movable devices engaging the respective portions of said flexible member and normally acting thereon in opposition to its tension to compensate for increase and decrease in the length of said member.

17. In an industrial truck, the combination of a wheel mounted frame, a main guide thereon, a separate guide slidable on said main guide, a load carrying member movable on said separate guide, power means on said frame, a guide element on the lower end of said main guide, a guide element on the upper end of said main guide, guide elements on the upper and lower ends of said separate guide, an endless flexible member driven by said power means, one portion of said flexible member engaging the guide element at the lower end of said main guide and connected to said load carrying member and the other portion of said flexible member engaging the said remaining guide elements and connected to said load carrying member, and spring actuated movable devices engaging the respective portions of said flexible member and normally acting thereon in opposition to its tension to compensate for increase and decrease in the length of said portions, respectively, one of said devices being operatively connected with said power means and arranged to stop it when said device is operated in one direction.

18. In an industrial truck, the combination of a wheel mounted frame, a main guide swingably mounted thereon to swing in the plane of said frame, a separate guide slidable on said main guide, a load carrying member movable on said separate guide, power means on said frame, a guide element on the upper end of said main guide, guide elements on the upper and lower ends of said separate guide, an endless flexible member driven by said power means, one portion of said flexible member engaging the guide element at the lower end of said main guide and connected to said load carrying member and the other portion of said flexible member engaging the remaining guide elements and connected to said load carrying member, and means for swinging said main guide.

19. In an industrial truck, the combination of a wheel mounted frame, a substantially vertical guide comprising a main section mounted on said frame and a separate section slidably mounted on said main section, a load carrying member slidably mounted on said separate section, means for raising said member and said separate section, means for locking said separate section to said main section in one position of said separate section, and a device carried by said load carrying member arranged to release said separate section when said member has traveled a predetermined distance in one direction relative thereto.

20. In an industrial truck, the combination of a wheel mounted frame, a guide thereon swingable inwardly and outwardly about its lower end, said guide comprising a main section and a separate section slidably mounted on said main section, a load carrying member slidably mounted on said separate section, means for raising and lowering said member relative to said separate section and the latter section relative to said main section, means for locking said sections together during travel of said member along said separate section, the operation of said locking means being controlled by the raising and lowering of said member, and means for swinging said guide inwardly and outwardly.

21. In an industrial truck, the combination of a wheel mounted frame, a guide thereon swingable inwardly and outwardly about its lower end, said guide comprising a main section and a separate section slidably mounted on said main section, a load carrying member slidably mounted on said separate section, means for raising and lowering said member relative to said separate section and the latter section relative to said main section, means for locking said sections together during travel of said member along said separate section, the operation of said locking means being controlled by the raising and lowering of said member, and means for swinging said guide inwardly and outwardly, said swing means including a power driven shaft, a substantially endwise movable rod operatively connected to said guide and operating connections between said shaft and said rod for moving the latter.

EDWARD H. REMDE.